United States Patent [19]
Blodgett et al.

[11] Patent Number: 5,798,902
[45] Date of Patent: Aug. 25, 1998

[54] LINEARITY SIGNAL COUPLER

[75] Inventors: James R. Blodgett, Derry, N.H.; Bruce R. Bouchard, Andover; Michael W. Goodwin, North Andover, both of Mass.; Robert B. Ward, Auburn, N.H.

[73] Assignee: Lucent Technologies Inc., Murray Hill, N.J.

[21] Appl. No.: 729,478

[22] Filed: Oct. 11, 1996

[51] Int. Cl.$^6$ .................................................... H01F 13/00
[52] U.S. Cl. ............................................. 361/149; 335/284
[58] Field of Search .................................. 361/149–151, 361/267, 143; 335/284

[56] References Cited

U.S. PATENT DOCUMENTS

| | | | |
|---|---|---|---|
| 1,281,084 | 10/1918 | Shaw et al. | 361/149 |
| 1,459,202 | 6/1923 | Fuller | 361/149 |
| 2,397,497 | 4/1946 | Mages | 361/149 |
| 3,588,624 | 6/1971 | Marvin | 361/149 |
| 3,638,074 | 1/1972 | Inouye | 361/149 |
| 3,859,573 | 1/1975 | Siems et al. | 361/149 |
| 3,895,270 | 7/1975 | Maddox | 361/149 |
| 4,384,313 | 5/1983 | Steingroever et al. | 361/149 |
| 4,470,094 | 9/1984 | Armond et al. | 361/149 |
| 4,471,403 | 9/1984 | Dress, Jr. et al. | 361/149 |
| 4,639,821 | 1/1987 | Littwin et al. | 361/151 |
| 4,829,397 | 5/1989 | Vernikov et al. | 361/149 |
| 5,557,493 | 9/1996 | Ross | 361/149 |

*Primary Examiner*—Fritz Fleming

[57] ABSTRACT

A method for improving the linearity of a signal coupling device having a ferrite core transformer comprises the step of demagnetizing the ferrite core. The resulting signal coupler has substantially zero remanent magnetism.

2 Claims, 3 Drawing Sheets

LINEARITY SIGNAL COUPLER

BACKGROUND OF THE INVENTION

This invention relates to a signal coupler for use in a broadband signal transmission network and, more particularly, to a method for improving the linearity of such a signal coupler as well as to the coupler resulting from use of the method.

Broadband CATV information networks must be designed such that analog and digital transmissions coexist. These networks require upstream and well as downstream transmission and, in the past, have used a frequency plan that allocated a frequency band of 5 MHz to 30 MHz to upstream transmissions and frequencies of 50 MHz and above to downstream transmissions. Typical converter upstream channels operate in the 5 MHz to 20 MHz range. However, in recent years, the pressure for more system capacity has caused the upstream frequency band to be expanded to 5 MHz to 40 MHz. At the same time, new services are demanding highly reliable upstream transmission, which translates to increased upstream transmission power. Since the second harmonic of signals in the 27 MHz to 40 MHz frequency band fall into television channels 2 through 5, these two changes taken together result in the need for improved linearity in network signal couplers (i.e., taps and splitter/combiners) to limit interference between upstream transmissions and downstream analog video services.

SUMMARY OF THE INVENTION

According to the present invention, there is provided a method for improving the linearity of a signal coupling device having a ferrite core transformer comprising the step of demagnetizing the ferrite core.

In accordance with an aspect of this invention, there is provided a signal coupling device having a ferrite core transformer wherein the ferrite core remanent magnetism is substantially zero.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
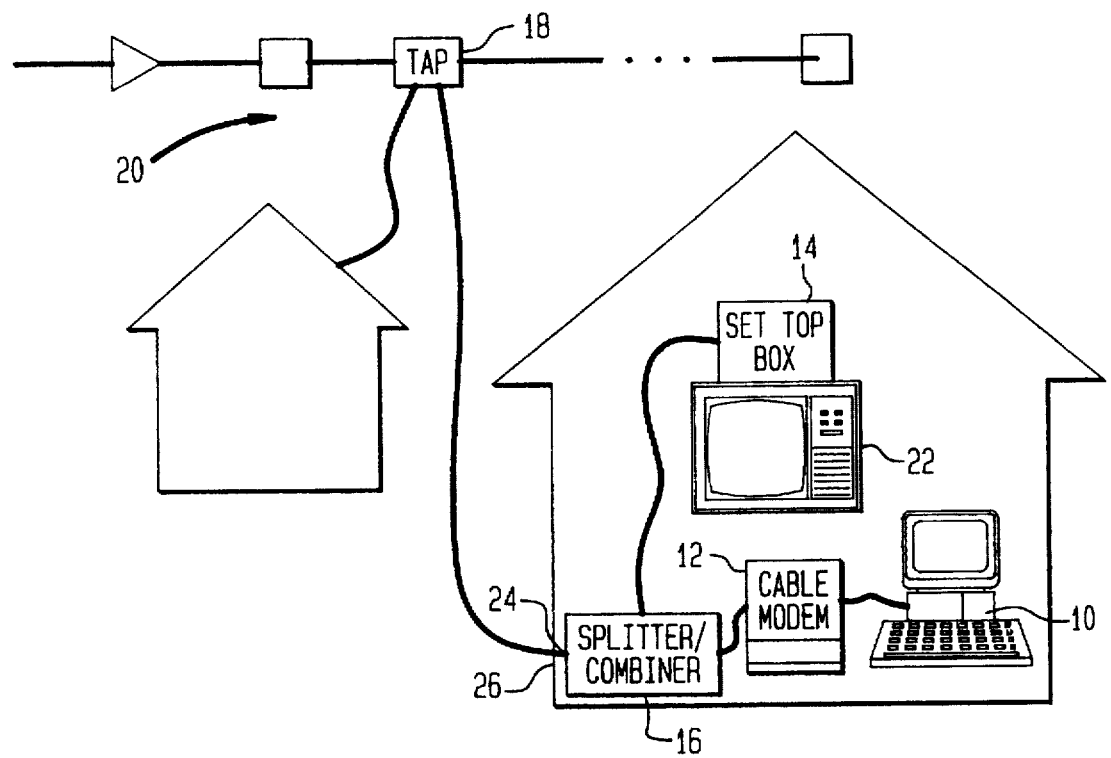
FIG. 1 illustrates a typical scenario for a broadband CATV application.

FIG. 1 shows a typical broadband CATV application scenario in which a personal computer (PC) 10 is connected to a cable modem 12. The modem 12 is connected, along with a set top box (STB) 14, through a 3 dB splitter/combiner 16 to a tap 18 on the coaxial cable network 20. The STB 14 and the modem 12 are two-way devices, receiving downstream signals in the frequency band 54 MHz to 750 MHz, and transmitting signals upstream in the frequency band from 5 MHz to 40 MHz. What is desired is for the STB 14 and the modem 12 to operate simultaneously without visible interference on the television 22, which receives its signals through the STB 14.

Assuming that the modem 12 does not produce a second harmonic directly, the only other source of non-linearity is the splitter/combiner 16 or the tap 18. The linearity requirements on those devices to meet the noninterference objective will now be discussed, using a simple tone signal source, realizing that a simple tone does not transfer much information but simplifies the analysis. It is assumed that the tone signal source operates at 27.2 MHz and transmits at +61 dBmV through a 100 foot long cable, resulting in a level of +60 dBmV at the port 24 of the splitter/combiner 16. Assuming a minimum level of +3 dBmV at the side of the subscriber home 26 (in accordance with FCC requirements), and 3.5 dB of splitter loss, the Channel 2 level at the splitter/combiner 16 port 24 is −0.5 dBmV. To be free of visible impairments, power in an interfering non-coherent tone must be 57 dB below the carrier or −57.5 dBmV. (other signal sources and modulation types will have different requirements.) This means that a second harmonic at 54.4 MHz generated in the tap 18 or the splitter/combiner 16 must be down 117.5 dB from the transmitted signal level. Existing coaxial taps and splitters have a problem meeting this requirement consistently.

To simplify the discussion of tap linearity, the second order modulation coefficient ($M_{2dBmV}$) is used. $M_{2dBmV}$ is defined as follows:

$$M_{2dBmV} = P(2f_1) - 2 \times P(f_1)$$

with ( ) expressed in dBmV. For the example given, the second order modulation coefficient of the tap 18 must be:

$$M_{2dBmV} < -57.5 \text{ dBmV} - (2 \times 60 \text{ dBmV}); \text{ or}$$

$$M_{2dBmV} < -177.5 \text{ dBmV}.$$

Typical values of $M_{2dBmV}$ measured on the taps and splitters of various manufacturers range from −130 dBmV to −180 dBmV. This is clearly a problem. Visually, the interference shows up as lines in the television picture having an orientation which varies with the frequency of the interfering source. For digitally modulated signal sources, the spectral density is lower, and for time division multiple access (TDMA) sources the duty cycle is lower than the tone source. Both of these factors serve to increase the $M_{2dBmV}$ allowable in system components, but not enough to eliminate the problem.

Figure 2:
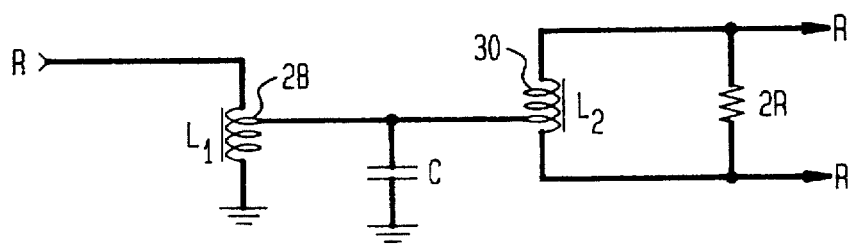
FIG. 2 is a simplified schematic diagram for an illustrative splitter/combiner network that is commonly used in CATV taps and splitter/combiners.

FIG. 2 shows a simplified schematic diagram for a splitter/combiner network that is commonly used in CATV taps and splitter/combiners. The inductors 28, 30 are realized using transmission line transformers wound on ferrite cores. Transmission line transformers can be analyzed by decomposing circuit currents into even mode and odd mode currents. The odd mode currents couple with both the generator and the load and provide the desirable transformation. The even mode currents usually couple with only one termination, shunting the other. Therefore, they restrict the passband and must be suppressed. This is done by increasing the even mode impedance, which is accomplished by winding the lines on ferrite cores. The odd mode currents of a tightly twisted transmission line generate a negligible external magnetic field which does not couple with the ferrite. The even mode currents generate a strong magnetic field which is greatly affected by the ferrite. It is this even mode current and the associated magnetic field that generates the second harmonic.

Figure 3:
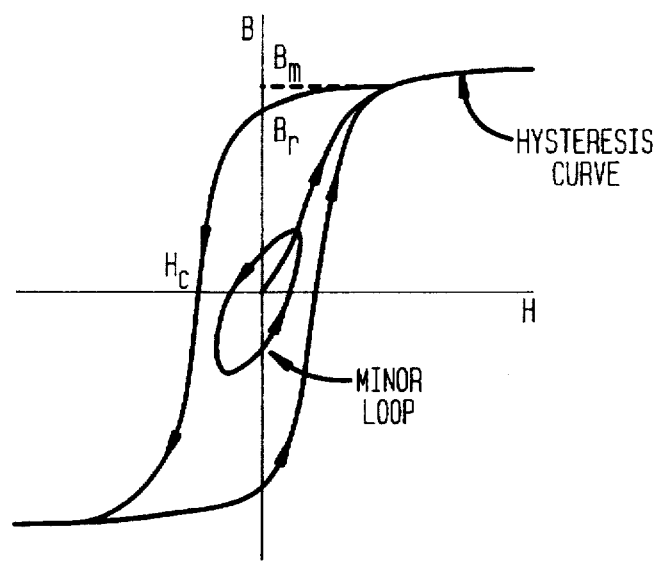
FIG. 3 shows an illustrative flux density (B) versus applied magnetic field (H) characteristic for ferrite materials.

Ferrite materials are inherently non-linear and one way a specific material can be characterized is by its B-H characteristic, which plots the resulting flux density (B) against the applied magnetic field (H). An illustrative B-H characteristic for a magnetic material is shown in FIG. 3. When the material is driven with a magnetic field strong enough to saturate it (meaning that further increases in magnetic field do not result in further increases in flux density) the result is the outer curve, which is referred to as the hysteresis curve. It is clear that as the material nears saturation the linearity degrades quickly (i.e., linear increases and applied magnetic field do not result in linear increases in flux density). Typical communications designs operate on what is referred to as a minor loop (as shown in FIG. 3 for a non-polarized material). Operation on the minor loop provides sufficient linearity that is suitable for most applications.

There is a point on the hysteresis curve which is designated as Br. This is the saturation remanence point, or the measure of the flux density that remains after a magnetic field sufficient to saturate the material is applied and then removed. If a material with remanent magnetism operates on a minor loop, the minor loop is centered at the remanence point and not the origin (i.e., [B=$B_r$, H=0] rather than [B=0, H=0]). Other remanence points exist for magnetic field strengths in addition to that required to saturate the material. Therefore, there are many points at which the material can operate other than around the origin.

Since the unpolarized ferrite non-linear transfer characteristic (i.e., hysteresis curve) exhibits odd symmetry (i.e., can be folded on top of itself across the Y-axis if either the left or right side is flipped across the X-axis), it would be expected that only odd harmonics would be generated. Since even harmonics are present, the transfer function must have an even component, which indicates it must be offset either up or down on the B-axis. This is interpreted as the material having a remanent flux density. In taps and splitter/combiners tested to date, this remanent magnetism appears to be random in polarity and strength, and most likely is irrelevant to most traditional applications. Accordingly, it has not been tracked as part of current manufacturing processes. It can be imagined that if the minor loop in FIG. 3 were translated to the remanence point, the result would be severely degraded linearity.

Figure 4:
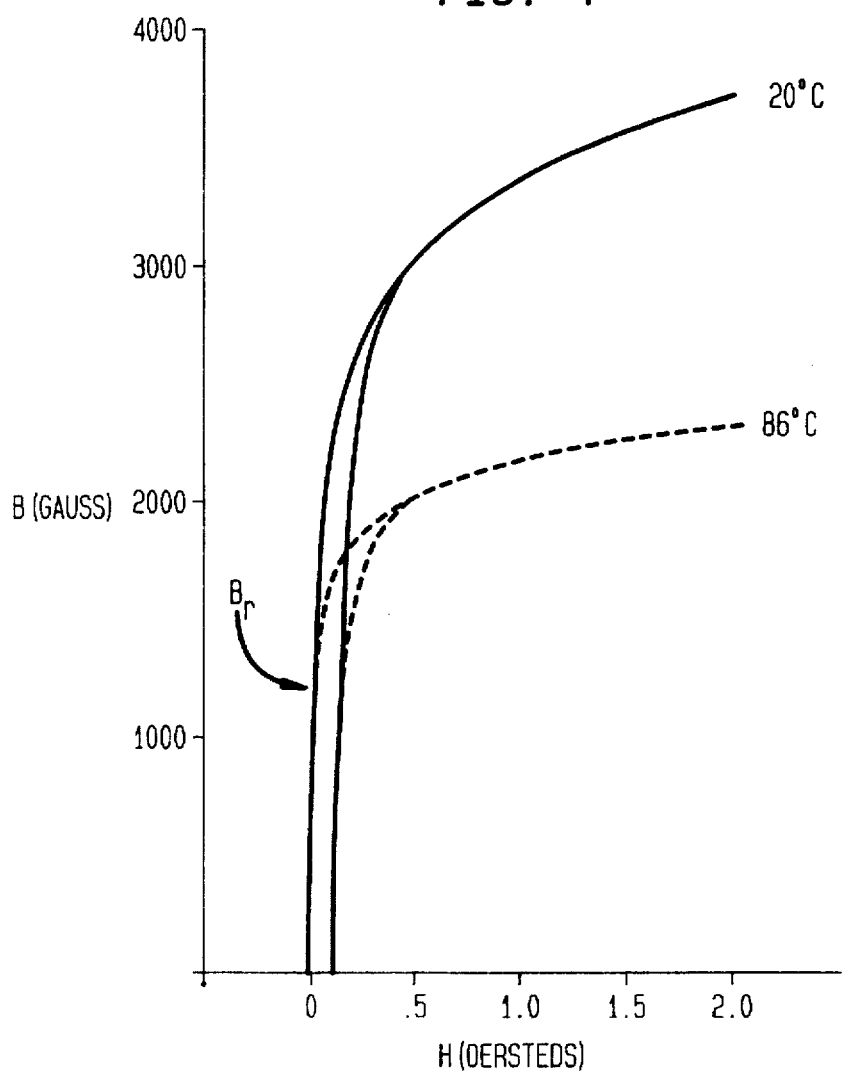
FIG. 4 illustrates a portion of the B–H curve for Ferroxcude 3E3 material.

FIG. 4 illustrates a portion of the B-H curve for Ferroxcude 3E3 material. This is a material which is recommended for broadband transformers and its hysteresis curve is different from that shown in FIG. 3. The remanence point at 20° C. still allows for significant linear range (since the minor loop at the frequencies of interest are very small). However, as can be seen, the linear range degrades as temperature increases and this has been verified with measurements made on existing taps and splitter/combiners.

Figure 5:
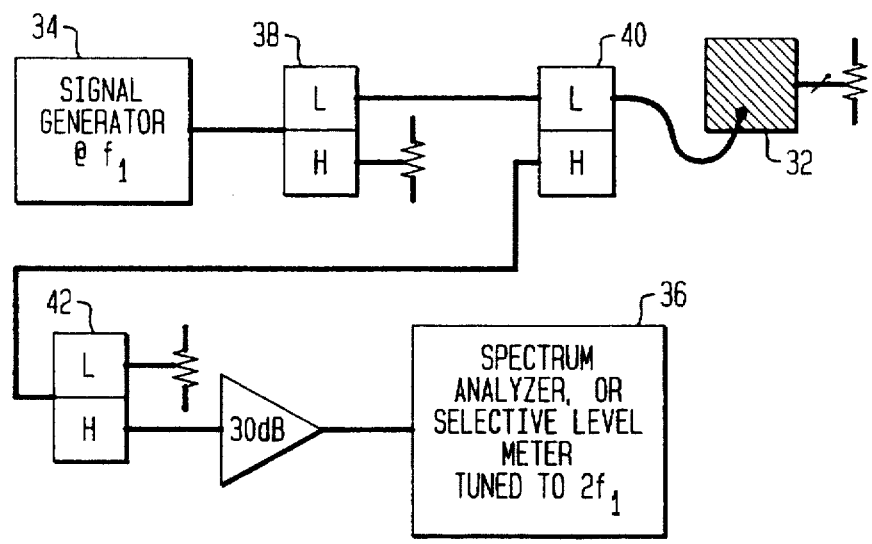
FIG. 5 shows an illustrative hardware setup for measuring the second order modulation coefficient of a signal coupler.

FIG. 5 illustrates hardware which may be used to measure the second order modulation coefficient ($M_{2dBmV}$) of a tap or splitter/combiner. The objective is to get enough signal into the device under test 32 to generate a measurable second harmonic from the device 32 and not from either the generator 34 or the spectrum analyzer 36. Readily available diplex filters 38, 40, 42 are usable as long as they are not constructed with ferrite core inductors. A properly constructed setup as shown in FIG. 5 should have a measurement noise floor of at least −70 dBmV. The diplex filters 38, 40, 42 have a low frequency passband of 5 MHz to 40 MHz and a high frequency passband of 54 MHz to 750 MHz. The frequency of the signal generator 34 should be variable from 27 MHz to 40 MHz. In the device under test 32, all unused ports are to be terminated.

Figure 6:
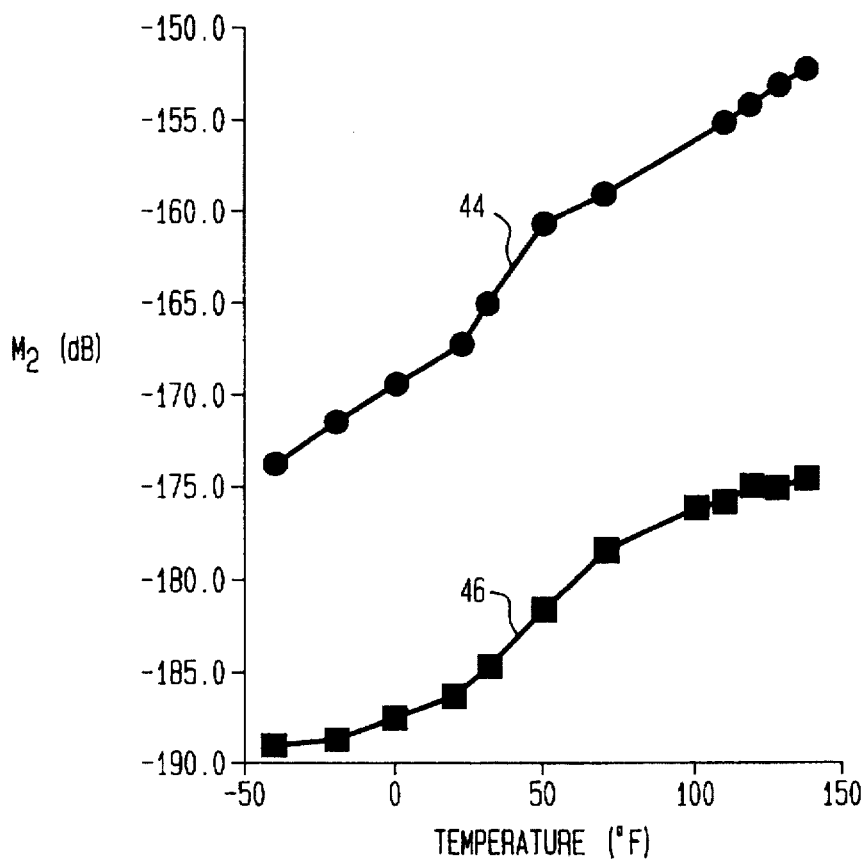
FIG. 6 illustrates a plot of second order modulation coefficient versus temperature of a signal coupler before and after demagnetization of the coupler's ferrite core.

Since the non-linearity is produced by remanent magnetism in the ferrite cores making up the tap 18 or splitter/combiner 16, according to the present invention the non-linearity is removed by demagnetizing/degaussing the ferrite cores to have a substantially zero remanent magnetization. The upper curve 44 in FIG. 6 shows the second order modulation coefficient $M_{dBmV}$ plotted as a function of temperature before demagnetization and the lower curve 46 shows $M_{dBmV}$ after demagnetization. The specific results shown in FIG. 6 were obtained with a relatively low power degausser (actually a low power consumer bulk tape eraser). Better results have been obtained with more powerful degaussers. Specifically, utilizing a time-varying magnetic field of strength in the range from about 600 gauss to about 700 gauss significantly reduces the second order modulation coefficient. Such demagnetization can be obtained utilizing a belt demagnetizer in situations where the coupler is not installed. If the coupler is installed, a handheld portable degausser can be used.

Tests to determine the effect on tap performance of the degaussing process has resulted in a finding of no degradation.

Since performance on the aforedescribed taps and splitter/combiners can be improved by degaussing/demagnetizing the ferrite cores therein, the question of how the cores can get remagnetized must be addressed. Power passing taps will carry varying current loads and therefore generate large magnetic fields internal to the tap which could cause problems. Measurements on specific power passing taps indicate that this is not a problem. AC magnetic fields present in the vicinity of taps or splitter/combiners are also potential problems. Measurements have shown that fields two orders of magnitude larger than those expected at typical tap or splitter/combiner installations are required to cause interference. AC magnetic fields will not permanently magnetize a tap or splitter/combiner, but could cause modulation of the remanence point sufficient to cause interference.

Lightning strikes generate large, short duration, pulse magnetic fields due to the current in the strike. However, the tap or splitter/combiner housing, while it is probably aluminum, will provide shielding from the pulse due to the eddy currents induced in the housing. Lightning strikes also generate surge currents in the coaxial cable plant which will pass through the tap. Measurements indicate that tap remagnetization does occur. The measurements made to date indicate that $M_{dBmV}$ does not meet internal requirements after lightning surge testing, but is not back to its fully magnetized level either. Also, lightning strikes are localized and any problem that results will be easily identifiable and resolved.

Accordingly, there has been disclosed a method for improving the linearity of a signal coupler for use in a broadband signal transmission network. The resulting coupler has also been disclosed. While an illustrative method and coupler have been disclosed herein, it is understood that various modifications and adaptations to the disclosed method and coupler will be apparent to one of ordinary skill in the art and it is intended that this invention be limited only by the scope of the appended claims.

What is claimed is:

1. A new method for using a demagnetized ferrite core in a splitter/combiner network for a broadband CATV information network, the splitter/combiner network having a ferrite core transformer, the method comprising the step of:

utilizing the demagnetized ferrite core as the core of the transformer to improve the linearity of the splitter/combiner network.

2. The new use of a demagnetized ferrite core as the core of a transformer in a splitter/combiner network for a broadband CATV information network to improve the linearity of the splitter/combiner network.

* * * * *